(12) United States Patent
Tsubaki et al.

(10) Patent No.: US 7,550,950 B2
(45) Date of Patent: Jun. 23, 2009

(54) BATTERY PACK AND PROTECTION CIRCUIT INCLUDING THERMISTOR THERMALLY CONNECTED TO SWITCHING ELEMENT

(75) Inventors: Shuji Tsubaki, Yasu (JP); Kazuto Miyagawa, Kuasatsu (JP); Yutaka Ikeda, Higashiomi (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 12/014,342

(22) Filed: Jan. 15, 2008

(65) Prior Publication Data

US 2008/0246441 A1  Oct. 9, 2008

Related U.S. Application Data

(62) Division of application No. 11/612,107, filed as application No. PCT/JP2005/009326 on May 23, 2005, now Pat. No. 7,391,185.

(30) Foreign Application Priority Data

Jun. 16, 2004 (JP) ............................. 2004-178440
Jul. 13, 2004 (JP) ............................. 2004-206244

(51) Int. Cl.
*H01M 10/46* (2006.01)
(52) U.S. Cl. .................................................. 320/150
(58) Field of Classification Search ................. 320/107, 320/134, 136, 150
See application file for complete search history.

(56) References Cited

U.S. PATENT DOCUMENTS 7,391,185 B2 *  6/2008  Tsubaki et al. .............. 320/150

FOREIGN PATENT DOCUMENTS

| JP | 8-032361 | 2/1996 |
| JP | 8-32361  | 2/1996 |

(Continued)

OTHER PUBLICATIONS

Written Opinion, Jul. 2005.
International Search Report issued Jul. 19, 2005.

(Continued)

*Primary Examiner*—Edward Tso
(74) *Attorney, Agent, or Firm*—Ostrolenk, Faber, Gerb & Soffen, LLP

(57) ABSTRACT

A battery pack includes a first switching element which shuts off a discharging current flowing to a battery cell and a second switching element which shuts off a charging current. A positive temperature coefficient thermistor is inserted between a gate control terminal of a protective control circuit and a gate of at least one of the switching elements, and a resistor is connected between the gate and a source of the switching element. The positive temperature coefficient thermistor is thermally connected to one or more of the first and second switching elements and/or to the battery cell. Thus, an abnormally overheated state of one or more of the switching elements or the battery cell leads to an increase in the resistance of the positive temperature coefficient thermistor causing shut-off of the switching element thereby protecting the battery pack.

11 Claims, 8 Drawing Sheets

FOREIGN PATENT DOCUMENTS

| | | |
|---|---|---|
| JP | 11-215716 | 8/1999 |
| JP | 2000-152516 | 5/2000 |
| JP | 2002-008608 | 1/2002 |
| JP | 2002-044871 | 2/2002 |
| JP | 2002-044873 | 2/2002 |
| JP | 2004-120849 | 4/2004 |

OTHER PUBLICATIONS

Office Action issued by the Chinese Patent Office on Dec. 7, 2007 in connection with the corresponding Chinese application No. 200580018425.4 with a Japanese translation and an English language translation.

Office Action issued by the Chinese Patent Office on Aug. 15, 2008 in connection with the corresponding Chinese application No. 200580018425.4 with a Japanese translation and an English language translation.

Chinese Office Action issued Aug. 15, 2008 in corresponding Chinese Application No. 200580018425.4, with Japanese translation and English-language translation of the cover page.

* cited by examiner (a)  (b)

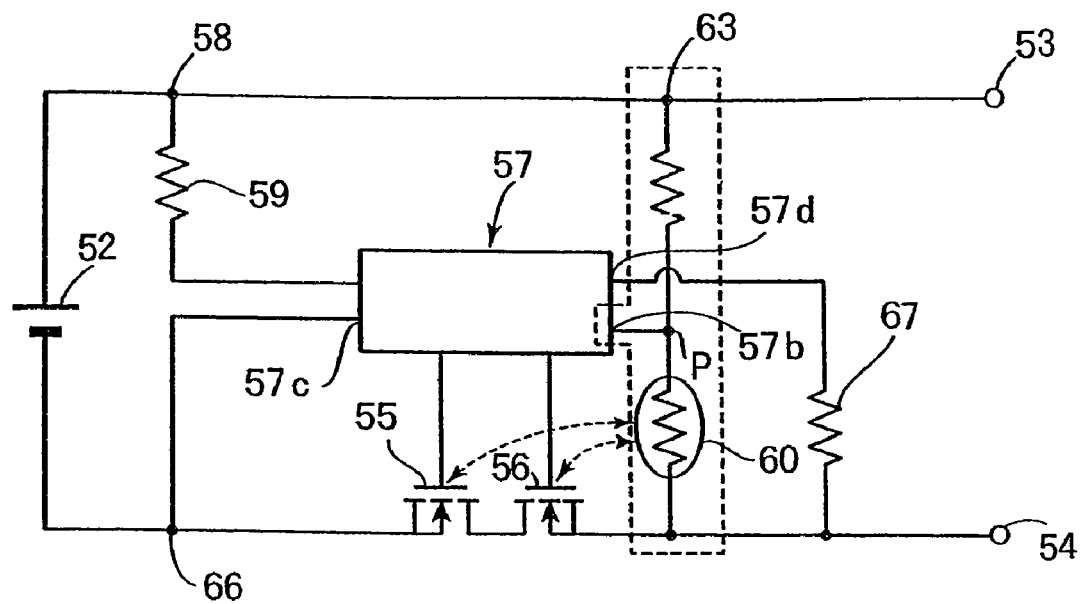
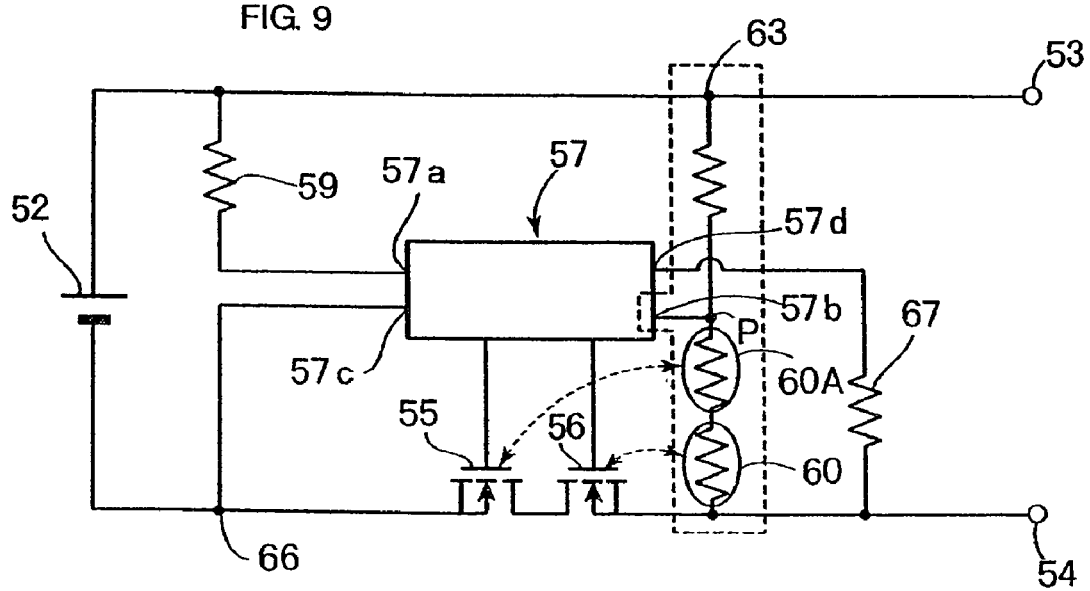

BATTERY PACK AND PROTECTION CIRCUIT INCLUDING THERMISTOR THERMALLY CONNECTED TO SWITCHING ELEMENT

CROSS-REFERENCE TO RELATED APPLICATIONS

The present application is a Divisional application of U.S. Ser. No. 11/612,107 filed Dec. 18, 2006, which application claims the benefit and priority of PCT/JP2005/009326 filed May 23, 2005, which claims priority of JP2004-178440 filed Jun. 16, 2004 and JP2004-206244 filed Jul. 13, 2004, incorporated by reference.

BACKGROUND OF THE INVENTION

1. Technical Field

The present invention relates to protection circuits which protect battery packs including secondary batteries from overcurrent and abnormal overheating. More particularly, the invention relates to battery pack protection circuits including positive temperature coefficient thermistors and switching elements, and battery packs related thereto.

2. Background Art

Patent Document 1: Japanese Unexamined Patent Application Publication No. 2000-152516, incorporated by reference.

Patent Document 2: Japanese Unexamined Patent Application Publication No. 2002-8608, incorporated by reference.

Patent Document 3: Japanese Unexamined Patent Application Publication No. 2004-120849, incorporated by reference.

In battery packs used as power supplies for mobile phones and the like, it has been required to provide two means of protection against overcurrent and overheating. Patent Document 1 shows a structure of a known protection circuit used for that purpose.

An example of a battery pack protection circuit disclosed in Patent Document 1 is shown in FIG. 11. In FIG. 11, a battery cell 131 is provided with a first switching element 134a and a second switching element 134b in the charge/discharge path and a protective control circuit 133 which controls them. A protective element 132, which in this example is a positive temperature coefficient thermistor, is connected in series in the charge/discharge path in the vicinity of the battery cell 131. If the switching elements 134a and 134b are abnormally overheated, resulting in thermal runaway or failure, even if the protective control circuit 133 detects the abnormality, since the switching elements 134a and 134b cannot be shut off, the protection function may not work. Even in such a case, because of the behavior of the protective element 132, it is possible to ensure the protection function against overcurrent and overheating of the battery cell.

Use of a polymer PTC element as an example of a positive temperature coefficient thermistor constituting a protective element 2 is described in Patent Document 2.

Furthermore, Patent Document 3 discloses a method in which, when a predetermined signal is applied to a first or second signal input terminal provided on a protective control circuit, a switching element is controlled to shut off the current path. In this method, when a signal showing that an abnormal current flows in the first signal input terminal, the switching element is controlled to shut off the current path. In addition, when a signal showing the temperature of the entire battery pack is input as the predetermined signal to the second signal input terminal, the current path is also shut off. That is, Patent Document 3 discloses a structure of a battery pack protection circuit in which an increase in the temperature of the entire battery pack is detected, and using the protection function of a protective control circuit, the current path is shut off when an abnormal temperature occurs.

The polymer PTC element used in Patent Document 2 as the protective element 2, however, has a heavy overall weight and a large volume and is of a lead type. Thus, when the polymer PTC element is incorporated into a battery pack, it is necessary to perform manual soldering and welding, resulting in an increase in manufacturing cost. Furthermore, even if a temperature fuse is used as the protective element 2, because of its heavy overall weight and large volume and because it again is of a lead type, the manufacturing cost is increased, as in the case of the polymer PTC element. Moreover, when the temperature fuse is disconnected due to an abnormal temperature, it cannot be reused. Furthermore, the protection function does not work against overcharge until the battery cell overheats and the protective element is activated. Thus, abnormal overheating of the switching elements 134a and 134b in itself cannot be protected against. Consequently, there is a possibility that the outer resin case of the battery pack may be deformed or melted due to abnormal overheating.

To overcome these problems, Patent Document 1 proposes a protection circuit in which a third switching element such as an FET is provided in place of the protective element 132, and the third switching element is controlled using a change in resistance with temperature of a negative temperature coefficient thermistor or a positive temperature coefficient thermistor provided in the battery pack. Thus, even when the protective control circuit 133 fails to function, it is possible to protect the battery pack from overcurrent during charging/discharging.

However, since the third switching element is inserted in series into the charge/discharge current path of the battery cell, an expensive power FET is required, and the cost is increased. Furthermore, use of the third switching element increases the possibility of thermal runaway or failure due to abnormal overheating.

On the other hand, in the battery pack protection circuit described in Patent Document 3, no resistor component is inserted in series into the current path. In the protection circuit according to Patent Document 3, the increase in temperature of the entire battery pack is detected, and when an abnormal temperature occurs, the switching element is controlled by the protective control circuit to shut off the current path. Consequently, it is not possible to detect a local increase in temperature in the battery pack. In reality, it is the switching element that is first brought into a high-temperature state by an overcurrent. Consequently, if only the switching element is in a high-temperature state, the entire battery pack may not yet reach a high-temperature state that allows the protection function to work. In such a case, the switching element is subjected to thermal runaway. Therefore, in some cases, the temperature of the entire battery pack is increased after the thermal runaway of the switching element, and even if it is attempted to control the switching element by the protective control circuit, the control may not be possible. That is, in the protection circuit described in Patent Document 3, since it is not possible to detect local overheating to protect the circuit, the protection function is not sufficient.

If this problem is addressed by setting a low protection-start temperature, there is a possibility that the protection operation may be activated even by overheating of a degree that causes no problem in reality.

SUMMARY OF THE INVENTION

The present invention improves upon the prior art by providing, for example, a battery pack protection circuit in which two means of protection against overcurrent and overheating are provided without requiring a protective element, such as a polymer PTC element, in series in the charge/discharge path of a battery cell and further without requiring a third switching element that is controlled by a positive temperature coefficient or negative temperature coefficient thermistor, and by providing a battery pack including such a battery pack protection circuit.

The present invention further provides a protection circuit which overcomes the shortcomings associated with the known techniques described above and in which a resistance component is not required in series with the current path, thus not resulting in an increase in loss, and which can protect a battery pack reliably even if local overheating occurs.

According to several embodiments of the invention, a battery pack protection circuit and a battery pack may have some or all of the following structures.

(1) A battery pack protection circuit of the present invention may include a first switching element which shuts off a discharging current flowing from a battery cell, a second switching element which shuts off a charging current flowing to the battery cell, and a protective control circuit which detects an abnormal state of the voltage, current, or ambient temperature of the battery cell and which controls the first and second switching elements to protect the battery cell from the abnormal state. A switching element control circuit may include at least one positive temperature coefficient thermistor, the switching element control circuit being thermally connected to at least one of the first switching element, the second switching element, and the battery cell, and being inserted into a control signal path of at least one of the first and second switching elements, so as to shut off the first or second switching element, the signal control path of which has the inserted switching element control circuit, on the basis of an increase in the resistance of the positive temperature coefficient thermistor during overheating of the first switching element, the second switching element, or the battery cell.

Protective control circuits are disclosed in Patent Documents 1-3, incorporated by reference.

(2) In the switching element control circuit, a plurality of positive temperature coefficient thermistors connected in series may be provided, and the plurality of positive temperature coefficient thermistors are thermally connected to each of at least two of the first switching element, the second switching element, and the battery cell.

(3) The switching element control circuit may be inserted only into the control signal path of the second switching element.

(4) The first switching element and the second switching element may be each an FET, and the protective control circuit may be an integrated circuit which is provided with a gate control terminal for controlling a gate of the FET.

(5) The switching element control circuit may include a resistor connecting between the gate and source of the FET, and at least one positive temperature coefficient thermistor inserted between the gate control terminal of the protective circuit and the gate of the FET.

(6) The switching element control circuit may include a control FET of which drain and source are each connected between the gate and source of the FET, and the at least one positive temperature coefficient thermistor connecting between the gate and source of the FET.

(7) A battery pack protection circuit of the present invention may include at least one switching element which has a control terminal, which is connected in series to a positive pole or a negative pole of a battery, and which shuts off a current path for charging/discharging when turned off during abnormality; and a protective control circuit connected to the control terminal of the at least one switching element such that the at least one switching element can be turned off when an abnormal current flows through the current path, the protective control circuit having a signal input terminal to which a signal showing an abnormal state other than the abnormal current is input, the at least one switching element being turned off when a signal showing an abnormal state other than the abnormal current is input to the signal input terminal, wherein a first positive temperature coefficient thermistor thermally connected to the at least one switching element is further provided, and a signal corresponding to a change in the resistance of the first positive temperature coefficient thermistor due to overheating of the switching element to which the first positive temperature coefficient thermistor is thermally connected is input, as the signal showing the abnormal state, to the signal input terminal.

(8) The battery pack protection circuit may be provided with a plurality of switching elements which shut off the current path, the first positive temperature coefficient thermistor may be thermally connected to each switching element, and a plurality of first positive temperature coefficient thermistors may be electrically connected in series.

(9) The battery pack protection circuit may further include at least one second positive temperature coefficient thermistor thermally connected to a heat-generating part other than the at least one switching element, wherein the first positive temperature coefficient thermistor thermally connected to the switching element and the at least one second positive temperature coefficient thermistor may be connected in series.

(10) The heat-generating part may correspond to a battery, the second positive temperature coefficient thermistor being thermally connected to the battery.

(11) The resistance-temperature characteristic of the first positive temperature coefficient thermistor thermally connected to the switching element may be different from the resistance-temperature characteristic of the second positive temperature coefficient thermistor thermally connected to the heat-generating part.

(12) A battery pack of the present invention may include the battery pack protection circuit having any one of the structures described above, and a battery cell protected by the battery pack protection circuit.

Advantages of the invention include some or all of the following:

(1) When the switching element control circuit is inserted into at least one of the control signal paths of the first and second switching elements and includes the positive temperature coefficient thermistor, the switching element control circuit is not provided in the charge/discharge path of the battery cell. Consequently, it is possible to use a very small chip element in which an extremely weak current flows, and thus the production cost can be reduced. Furthermore, since a third switching element is not required to be inserted into the charge/discharge path of the battery cell, small size and low cost can be achieved.

Moreover, since the first or second switching element is shut off on the basis of an increase in the resistance of the positive temperature coefficient thermistor during overheating of the first switching element, the second switching element, or the battery cell, even if the protective control circuit fails to function, the protection function can be carried out by the switching element control circuit, the first or second switching element, and the positive temperature coefficient thermistor. Thus, two means of protection are ensured.

(2) In the switching element control circuit, when a plurality of positive temperature coefficient thermistors are connected in series, the plurality of positive temperature coefficient thermistors are thermally connected to at least two of the first switching element, the second switching element, and the battery cell. Consequently, the positive temperature coefficient thermistors can be strongly thermally connected to the switching element or the battery cell, and response to overheating protection can be enhanced. Moreover, since the plurality of positive temperature coefficient thermistors are simply connected in series, the scale of the circuit does not substantially increase.

(3) When the positive temperature coefficient thermistor is provided only on the control signal path of the second switching element, it is possible to perform protection during charging, in which overcurrent is highly likely to flow when abnormality occurs. That is, reliability can be greatly ensured with a small number of components.

(4) When the first switching element and the second switching element are each an FET, and the protective control circuit is an integrated circuit which is provided with a gate control terminal for controlling the gate of the FET, a decrease in voltage at the first and second switching elements can be prevented, and overall size and weight reduction can be achieved.

(5) When the switching element control circuit includes a resistor connecting between the gate and source of the FET, and the at least one positive temperature coefficient thermistor inserted between the gate control terminal of the protective circuit and the gate of the FET, the switching element control circuit can be formed by adding only the positive temperature coefficient thermistor and the resistor, and thus two means of protection can be provided while achieving overall reduction in size, weight, and cost.

(6) When the switching element control circuit includes a control FET of which drain and source are each connected between the gate and source of the FET, and the at least one positive temperature coefficient thermistor connecting between the gate and source of the FET, it is possible to further decrease the voltage between the gate and source of the control FET during abnormality, and the shut-off of the control FET can be performed more reliably.

(7) Furthermore, a battery pack protection circuit of the present invention may include at least one switching element which shuts off a current path when turned off during abnormal current flow, and a protective control circuit connected to the switching element such that the at least one switching element can be turned off when an abnormal current flows. Consequently, during abnormal current flow, at least one switching element is allowed to shut off the current path by the protective control circuit. The protective control circuit is provided with a signal input terminal to which a signal showing an abnormal state other than the abnormal current is input, and the at least one switching element is turned off when a signal showing an abnormal state other than the abnormal current is input to the signal input terminal, and thus the current path is shut off.

Furthermore, a first positive temperature coefficient thermistor may be thermally connected to the at least one switching element. When the switching element is in an overheated state, a signal corresponding to a change in the resistance of the first positive temperature coefficient thermistor is input to the signal input terminal. That is, in addition to the case when the abnormal current flows, even in the case when at least one switching element is in an overheated state, the switching element is controlled by the protective control circuit, and thus the current path is shut off.

Consequently, overheating of the switching element itself is detected, and the switching element is controlled by the protective control circuit to shut off the current path. Therefore, it is possible to rapidly protect the battery pack before the entire battery pack is overheated.

Furthermore, in the present invention, the first positive temperature coefficient thermistor may be thermally connected to at least one switching element. Since the first positive temperature coefficient thermistor is not inserted into the current path for charging/discharging of the battery, an increase in the loss due to the use of the positive temperature coefficient thermistor hardly occurs.

Consequently, according to this feature of the present invention, it is possible to provide a battery pack protection circuit having low loss and excellent protection performance.

(8) In the case in which a plurality of switching elements are provided, the first positive temperature coefficient thermistor may be thermally connected to each switching element, and a plurality of first positive temperature coefficient thermistors may be electrically connected in series. Since the resistance-temperature characteristic curve is steep in positive temperature coefficient thermistors, if any one of the plurality of positive temperature coefficient thermistors connected in series detects an abnormal temperature which increases its resistance, the resistance of the entire circuit composed of the positive temperature coefficient thermistors connected in series is greatly increased. Therefore, simply by detecting the change in resistance in the series circuit, the battery pack can be reliably protected even when abnormal overheating occurs in any of the plurality of switching elements.

(9) The idea of using an NTC thermistor is possible. However, in the case of the NTC thermistor, since the change in resistance with temperature is gradual, even if a plurality of NTC thermistors are connected in series, the change in series resistance is small, and it is difficult to detect abnormal overheating. Consequently, in such a case, a circuit is provided, for example, in which the change in resistance of each NTC thermistor is compared with a predetermined value using a comparator, and the logical OR of results of the individual comparators is calculated and input to a protective IC. As a result, the circuit configuration becomes complex, and it becomes difficult to reduce the size.

(10) In the case in which at least one second positive temperature coefficient thermistor thermally connected to a heat-generating part other than the at least one switching element is provided, and the first positive temperature coefficient thermistor thermally connected to the switching element and the at least one second positive temperature coefficient thermistor are connected in series, the battery pack can be protected by detecting abnormal overheating in the switching element, and it is also possible to protect the battery pack when abnormal overheating occurs in the heat-generating part to which the second positive temperature coefficient thermistor is thermally connected.

(11) In the case in which the heat-generating part corresponds to a battery and the second positive temperature coefficient thermistor is thermally connected to the battery, it is possible to protect the battery pack when the battery itself is abnormally overheated.

(12) In the case in which the resistance-temperature characteristic of the first positive temperature coefficient thermistor thermally connected to the switching element is different from the resistance-temperature characteristic of the second positive temperature coefficient thermistor thermally connected to the heat-generating part, it is possible to select the resistance-temperature characteristic of the first positive temperature coefficient thermistor and the resistance-temperature characteristic of the second positive temperature coefficient thermistor according to the amount of heat generated at the switching element during abnormality and the amount of heat generated at the other heat-generating part during abnormality. Consequently, the protection operation during abnormal overheating can be more reliably and more rapidly carried out.

(13) A battery pack provided with the battery pack protection circuit having the functions described above and a battery cell can be used as a highly reliable battery pack with small size, low weight, and low cost.

Other features and advantages of the present invention will become apparent from the following description of embodiments of invention which refers to the accompanying drawings.

BRIEF DESCRIPTION OF THE DRAWINGS

FIG. 8 is a circuit diagram showing a battery pack protection circuit according to a variation example of the sixth embodiment.

FIG. 9 is a circuit diagram showing a battery pack protection circuit according to another variation example of the sixth embodiment.

DETAILED DESCRIPTION OF EMBODIMENTS OF THE INVENTION

A structure of a battery pack protection circuit and a battery pack according to a first embodiment will be described below with reference to FIG. 1.

Figure 1:
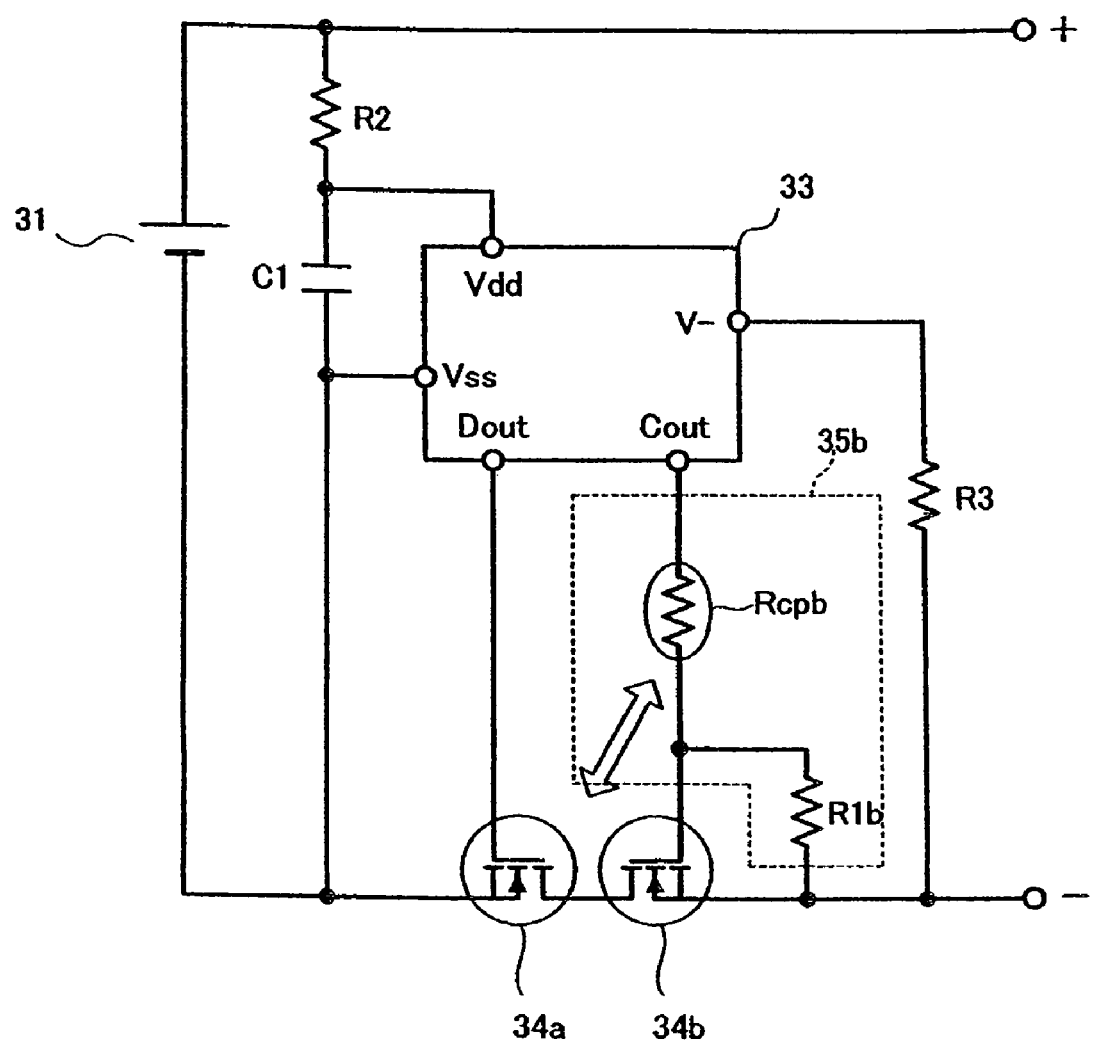
FIG. 1 is a circuit diagram showing a structure of a battery pack protection circuit and a battery pack according to a first embodiment.

FIG. 1 is a circuit diagram of a battery pack 40 provided with a battery pack protection circuit. A first switching element 34a and a second switching element 34b are disposed in series in a charge/discharge path of a battery cell 31. In a protective control circuit 33, a grounding terminal Vss thereof is connected to a negative pole of the battery cell 31, and a terminal Vss is connected via a resistor R2 to a positive pole of the battery cell 31. A capacitor C1 for eliminating a noise signal is connected between the terminals Vdd and Vss. A resistor R3 is connected between a terminal V− of the protective control circuit 33 and a minus (−) terminal of the battery pack 40.

The first and second switching elements 34a and 34b each comprise an FET. The protective control circuit 33 is composed of a semiconductor integrated circuit and is provided with gate control terminals Dout and Cout for the first and second switching elements 34a and 34b, respectively. The terminal Dout is connected to a gate of the first switching element 34a. A ceramic positive temperature coefficient thermistor Rcpb is connected in series between the other gate control terminal Cout and a gate of the second switching element 34b. A resistor R1b is connected between the gate and a source of the second switching element 34b. The resistor R1b and the ceramic positive temperature coefficient thermistor Rcpb constitute a switching element control circuit 35b.

The protective control circuit 33 operates using a voltage between the terminals Vdd and Vss as a power supply, detects a charging current and a discharging current on the basis of a potential difference between the terminal Vss and the terminal V−, and shuts off the second switching element 34b by setting the terminal Cout to a low level when overcurrent is detected during charging. The protective control circuit 33 also shuts off the first switching element 34a by setting the terminal Dout to a low level when overcurrent is detected during discharging.

The operation of the circuit shown in FIG. 1 is as follows:

At normal times, the gate control terminals Cout and Dout of the protective control circuit 33 are set to a high level to turn on the first and second switching elements 34a and 34b. Thus, normal charging and discharging are possible.

When the charging current increases and the potential difference between the terminal Vss and the terminal V− exceeds a predetermined threshold value, the protective control circuit 33 sets the terminal Cout to a low level. Thus, the switching element 34b is shut off and the overcurrent is prevented.

When the discharging current increases and the potential difference between the terminal Vss and the terminal V− exceeds a predetermined threshold value, the protective control circuit 33 sets the terminal Dout to a low level. Thus, the switching element 34a is shut off and the overcurrent is prevented.

Meanwhile, independently of the operation of the protective control circuit 33, if some sort of abnormality occurs and the charging current becomes overcurrent, leading to an overheated state of the first switching element 34a or the second switching element 34b, and if the temperature of the ceramic positive temperature coefficient thermistor Rcpb which is thermally connected thereto is increased to a temperature exceeding its Curie point, the resistance increases abruptly. As a result, the voltage between the gate and source of the second switching element 34b is decreased to shut off the switching element 34b. Thus, the current flowing to the battery cell 31 is shut off and the abnormality is avoided.

In FIG. 1, the resistor R1b has a resistance of 500 kΩ, and the ceramic positive temperature coefficient thermistor Rcpb is of a surface mounting type with a size of 1.0×0.5×0.5 mm in which R25 (resistance at 25° C.)=47 kΩ and the Curie temperature is 100° C. The ceramic positive temperature coefficient thermistor Rcpb is disposed on a substrate so as to be thermally connected to both the first and second switching elements 34a and 34b.

In such a manner, before the temperature reaches the level that causes thermal runaway or failure of the first and second switching elements 34a and 34b, it is possible to prevent current from passing therethrough. Thus, the battery cell and the first and second switching elements 34a and 34b can be protected from permanent breakdown.

Although the ceramic positive temperature coefficient thermistor Rcpb is thermally connected to both the first and second switching elements 34a and 34b in the example shown in FIG. 1, the thermistor Rcpb may be thermally connected to either one of the switching elements. Even in such a case, since the first and second switching elements 34a and 34b are both heated by overcurrent during charging or discharging, the same effect as that described above can be achieved.

The ceramic positive temperature coefficient thermistor Rcpb may also be thermally connected to the battery cell 31, in addition to the thermal connection to the first and second switching elements 34a and 34b. Thus, the thermistor Rcpb detects heat generation of the battery cell 31 caused by overcurrent during charging or discharging, and protection can be performed.

A structure of a battery pack protection circuit and a battery pack according to a second embodiment will be described below with reference to FIG. 2.

In the example shown in FIG. 1, a single ceramic positive temperature coefficient thermistor is used. In the second embodiment, a plurality of ceramic positive temperature coefficient thermistors which are respectively thermally connected to different parts are used. That is, a series circuit including a positive temperature coefficient thermistor Rcp1 for battery cell use and a positive temperature coefficient thermistor Rcp2 for switching element use is inserted between a gate control terminal Cout of a protective control circuit 33 and a gate of a second switching element 34b. A resistor R1b is connected between a source and the gate of the second switching element 34b. The resistor R1b and the two ceramic positive temperature coefficient thermistors Rcp1 and Rcp2 constitute a switching element control circuit 35b. The remainder of the structure is the same as that shown in FIG. 1.

Figure 2:
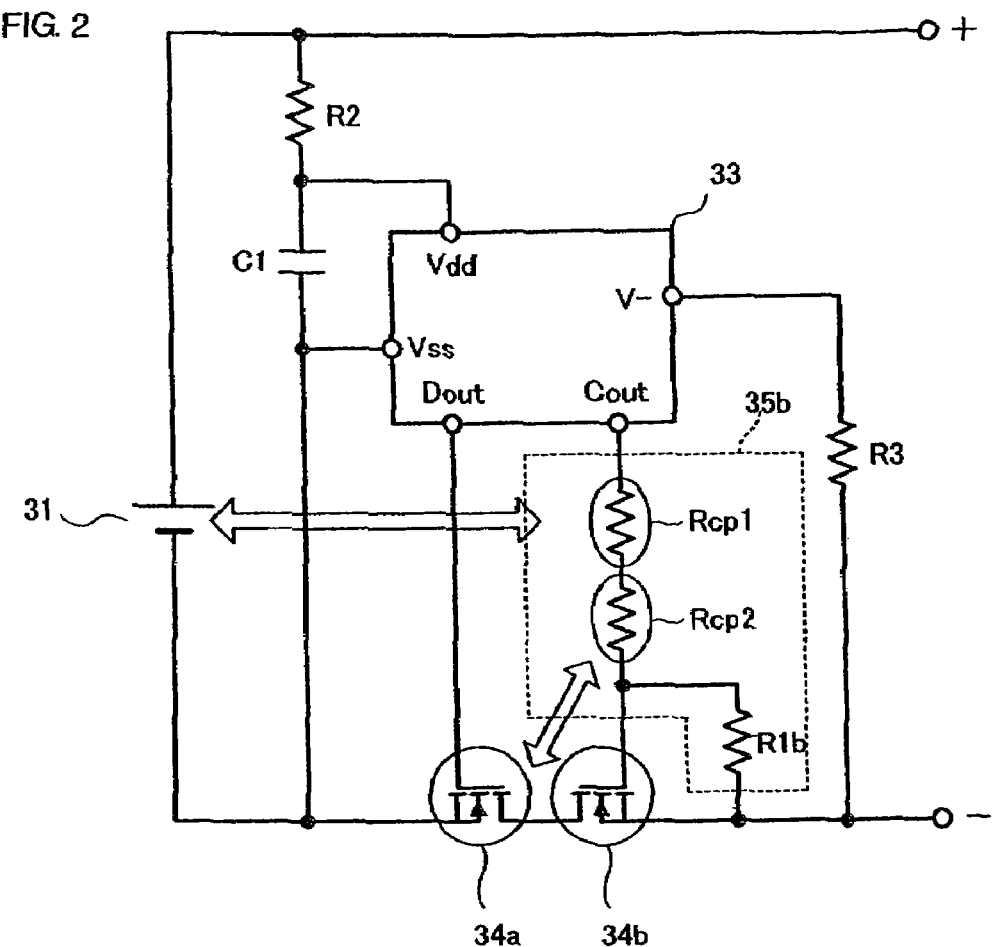
FIG. 2 is a circuit diagram showing a structure of a battery pack protection circuit and a battery pack according to a second embodiment.

In FIG. 2, the ceramic positive temperature coefficient thermistor Rcp1 for battery cell use is thermally connected to a battery cell 31. The ceramic positive temperature coefficient thermistor Rcp2 for switching element use is thermally connected to first and second switching elements 34a and 34b. By using a plurality of ceramic positive temperature coefficient thermistors, the heat-generating part of the battery cell 31 and the first and second switching elements 34a and 34b can be placed at positions distant from each other, and the degree of freedom in structural design is increased. Furthermore, if the temperature of either one of the first and second switching elements exceeds the Curie point, protection operation is carried out. Consequently, by allowing protection operations to be carried out at different temperatures, the protection operation can be optimized according to the target and temperature of the overheated part.

It is to be noted that the two thermistors which are independently thermally connected are each a ceramic positive temperature coefficient thermistor. In ceramic positive temperature coefficient thermistors, the ratio of the increase in resistance to the increase in temperature is very high. Thus, by simply connecting ceramic positive temperature coefficient thermistors in series, a circuit can be constructed. That is, the logical OR condition that, if the temperature of either one of the ceramic positive temperature coefficient thermistors connected in series exceeds the Curie point, protection operation is carried out, can be satisfied. It is less feasible to construct a circuit that carries out such a protection operation using negative temperature coefficient thermistors. In negative temperature coefficient thermistors, the ratio of the change in resistance to the change in temperature is extremely low compared with positive temperature coefficient thermistors. Consequently, assuming two negative temperature coefficient thermistors are connected in series, the changes in temperature of the two negative temperature coefficient thermistors appear only as a change in the combined resistance of the two negative temperature coefficient thermistors, and it is less feasible to detect heat at two points simultaneously on the basis of the change in the combined resistance and to carry out protection operation when one temperature exceeds a predetermined upper limit.

Figure 3:
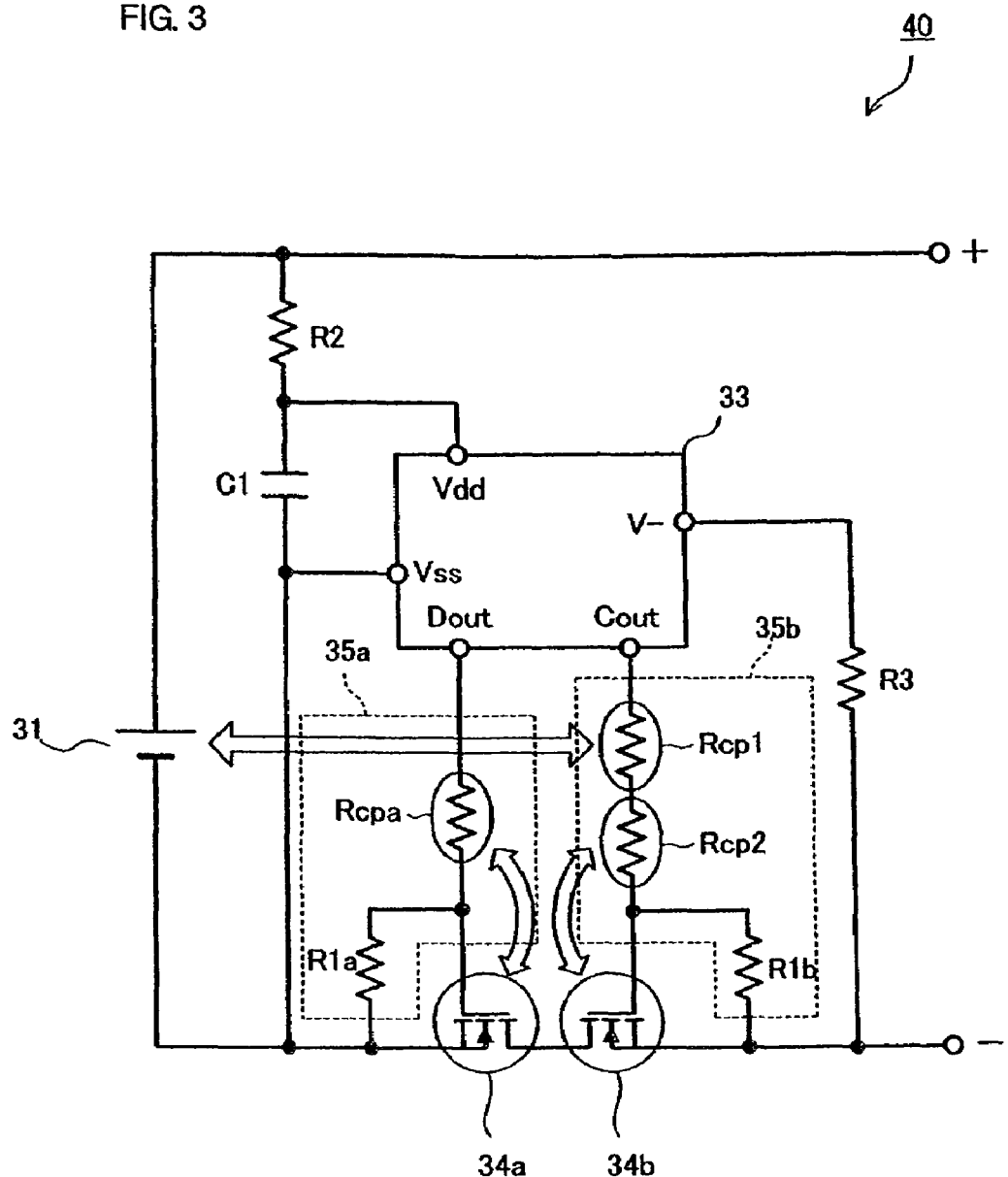
FIG. 3 is a circuit diagram showing a structure of a battery pack protection circuit and a battery pack according to a third embodiment.

A structure of a battery pack protection circuit and a battery pack 40 according to a third embodiment will be described below with reference to FIG. 3.

In the examples shown in FIGS. 1 and 2, the switching element control circuit 35b is provided in the control signal path of the second switching element 34b. In the third embodiment, a switching element control circuit 35a is also provided in the control signal path of the first switching element 34a. That is, a ceramic positive temperature coefficient thermistor Rcpa which is thermally connected to the first switching element 34a is inserted between the gate of the first switching element 34a and the gate control terminal Dout of the protective control circuit 33, and a resistor R1a is connected between the gate and source of the switching element 34a. The resistor R1a and the ceramic positive temperature coefficient thermistor Rcpa constitute the switching element control circuit 35a. The remainder of the structure is the same as that shown in FIG. 2.

According to this structure, the resistance of the ceramic positive temperature coefficient thermistor Rcpa is increased by overheating of the first switching element 34a due to overcurrent during discharging. Thus, the first switching element 34a is shut off and protected from the overcurrent. The protection operation during charging is the same as that in the second embodiment.

A structure of a battery pack protection circuit and a battery pack 40 according to a fourth embodiment will be described below with reference to FIG. 4.

In the first to third embodiments, the ceramic positive temperature coefficient thermistor(s) and the resistor constitute the switching element control circuit. In the fourth embodiment, switching element control circuits 35a and 35b are provided in the control signal paths of first and second switching elements 34a and 34b. Another switching element 36a or 36b is further provided within each switching element control circuit. The switching elements 36a and 36b are control FETs for controlling the switching elements 34a and 34b, respectively.

In the switching element control circuit 35b, the drain and source of the switching element 36b are connected between the gate and source of the switching element 34b, a resistor R5b is connected between the gate of the switching element 34b and the gate control terminal Cout of the protective control circuit 33, a resistor R4b is connected between the gate control terminal Cout and the gate of the switching element 36b, and a ceramic positive temperature coefficient thermistor Rcpb is connected between the gate and source of the switching element 36b.

Similarly, in the switching element control circuit 35a, the drain and source of the switching element 36a are connected between the gate and source of the switching element 34a, a resistor R5a is connected between the gate of the switching element 34a and the gate control terminal Dout of the protective control circuit 33, a resistor R4a is connected between the gate control terminal Dout and the gate of the switching element 36a, and a ceramic positive temperature coefficient thermistor Rcpa is connected between the gate and source of the switching element 36a.

The ceramic positive temperature coefficient thermistor Rcpa is thermally connected to the switching element 34a. The ceramic positive temperature coefficient thermistor Rcpb is thermally connected to the switching element 34b.

Figure 4:
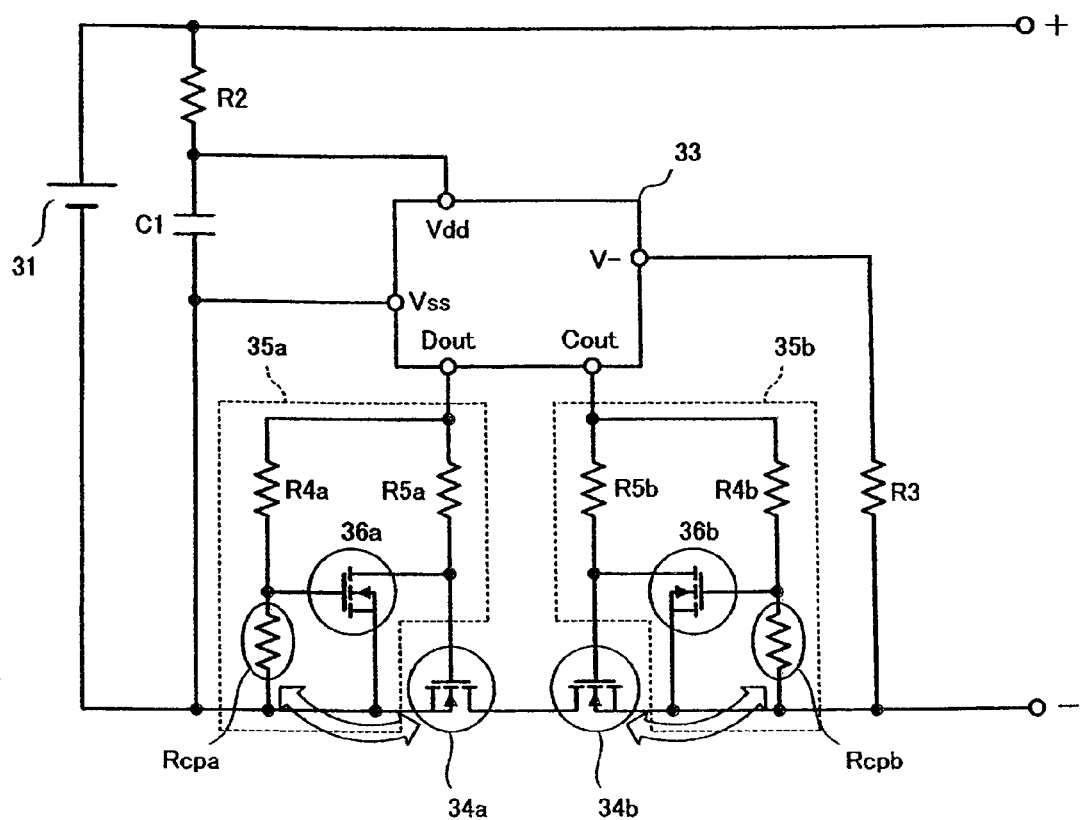
FIG. 4 is a circuit diagram showing a structure of a battery pack protection circuit and a battery pack according to a fourth embodiment.

The operation of the circuit shown in FIG. 4 is as follows:

At normal times, the gate control terminals Cout and Dout of the protective control circuit 33 are set to a high level to turn on the first and second switching elements 34a and 34b. Thus, normal charging and discharging are possible.

When the charging current increases and the potential difference between the terminal Vss and the terminal V− of the protective control circuit 33 exceeds a predetermined threshold value, the protective control circuit 33 sets the terminal Cout to a low level. Thus, the switching element 34b is shut off and the overcurrent is prevented. When the discharging current increases and the potential difference between the terminal Vss and the terminal V− of the protective control circuit 33 exceeds a predetermined threshold value, the protective control circuit 33 sets the terminal Dout to a low level. Thus, the switching element 34a is shut off and the overcurrent is prevented.

Meanwhile, independently of the operation of the protective control circuit 33, if some sort of abnormality occurs and the charging current becomes overcurrent, leading to an overheated state of the second switching element 34b and if the temperature of the ceramic positive temperature coefficient thermistor Rcpb which is thermally connected thereto is increased to a temperature exceeding its Curie point, the resistance increases abruptly. Thereby, the voltage between the gate and source of the switching element 36b is increased and the switching element 36b is turned on. As a result, the voltage between the gate and source of the switching element 34b is decreased to shut off the switching element 34b. Thus, the current flowing to the battery cell 31 is shut off and the abnormality is avoided.

Similarly, if the discharging current becomes overcurrent, leading to an overheated state of the first switching element 34a and if the temperature of the ceramic positive temperature coefficient thermistor Rcpa which is thermally connected thereto is increased to a temperature exceeding its Curie point, the resistance increases abruptly. Thereby, the voltage between the gate and source of the switching element 36a is increased and the switching element 36a is turned on. As a result, the voltage between the gate and source of the switching element 34a is decreased to shut off the switching element 34a. Thus, the current flowing from the battery cell 31 is shut off and the abnormality is avoided.

By providing the switching elements 36a and 36b, which are control FETs, in the switching element control circuits 35a, 35b, as described above, the voltage between the gate and source of each of the switching elements 34a and 34b can be further decreased during abnormality, and the switching elements 34a and 34b can be more reliably shut off.

Figure 5:
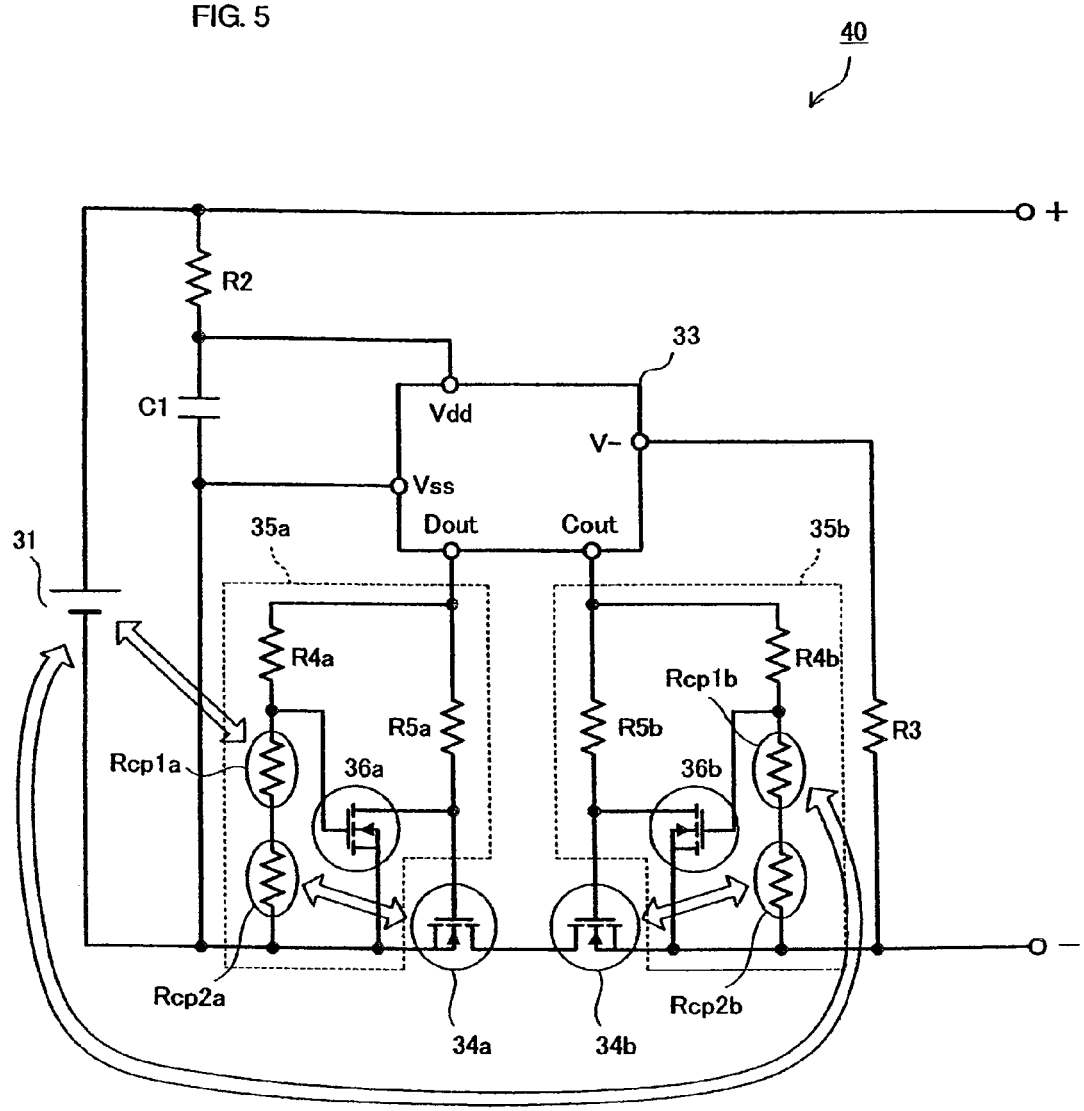
FIG. 5 is a circuit diagram showing a structure of a battery pack protection circuit and a battery pack according to a fifth embodiment.

A structure of a battery pack protection circuit and a battery pack 40 according to a fifth embodiment will be described below with reference to FIG. 5.

The fifth embodiment is different from the example shown in FIG. 4 in that the ceramic positive temperature coefficient thermistor portion is composed of a series circuit including two ceramic positive temperature coefficient thermistors. One of the ceramic positive temperature coefficient thermistors is thermally connected to the first switching element 34a or the second switching element 34b, and the other is thermally connected to the battery cell 31.

Because of such a structure, if the battery cell 31 is overheated and the ceramic positive temperature coefficient thermistor Rcp1a reaches a temperature exceeding the Curie point, the switching element 36a is turned on and the switching element 34a is shut off. Thus, the battery cell 31 is protected from overheating. Similarly, if the ceramic positive temperature coefficient thermistor Rcp1b reaches a temperature exceeding the Curie point, the switching element 36b is turned on and the switching element 34b is shut off. Thus, the battery cell 31 is protected from overheating. Consequently, if even one of the switching elements 34a and 34b and battery cell 31 is overheated, the protection operation is performed. The remainder of the operation is the same as that in the fourth embodiment.

By using the structure in which the ceramic positive temperature coefficient thermistor portion is divided into the ceramic positive temperature coefficient thermistor Rcp2a or Rcp2b for switching element use which is thermally connected to at least one of the first and second switching elements 34a and 34b and the ceramic positive temperature coefficient thermistor Rcp1a or Rcp1b for battery cell use which is thermally connected to the battery cell 31, and the two ceramic positive temperature coefficient thermistors are electrically connected in series, the ceramic positive temperature coefficient thermistors Rcp2a and Rcp2b for switching element use are strongly thermally connected to the switching elements 34a and 34b, respectively, and the ceramic positive temperature coefficient thermistors Rcp1a and Rcp1b for battery cell use are strongly thermally connected to the battery cell 31. Thus, response to overheating protection can be enhanced. Moreover, from the standpoint of the circuit design, since the two ceramic positive temperature coefficient thermistors are simply connected in series, the scale of the circuit does not substantially increase.

Figure 6:
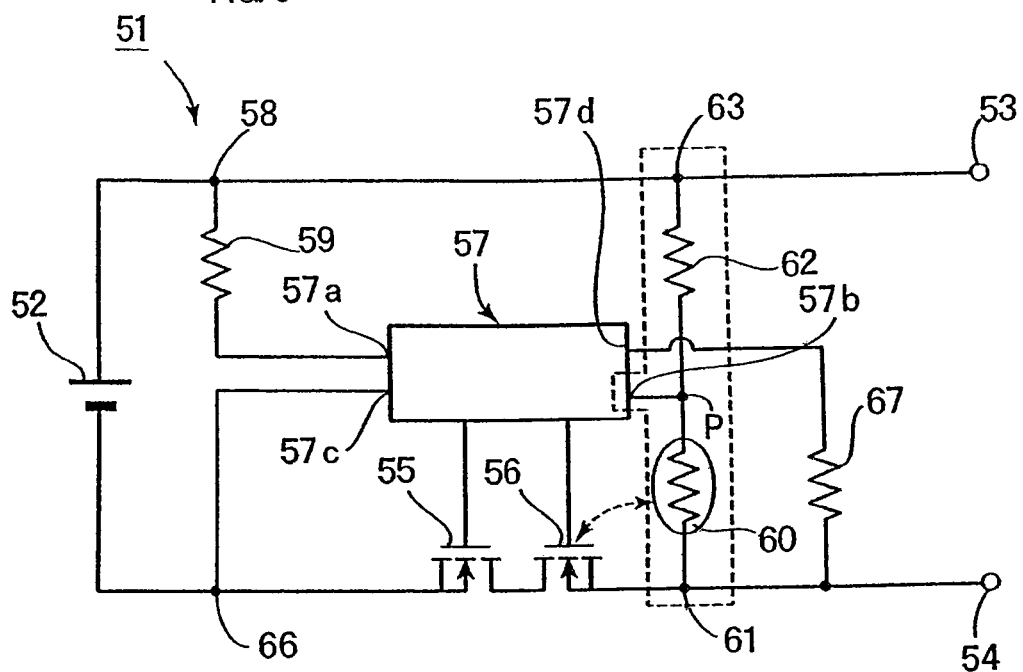
FIG. 6 is a circuit diagram showing a battery pack protection circuit according to a sixth embodiment.

FIG. 6 is a circuit diagram for the purpose of explaining a battery pack protection circuit according to a sixth embodiment of the present invention. A battery pack 51 includes a battery cell 52 and a protection circuit for protecting the battery cell 52 as shown in FIG. 6.

The positive pole of the battery cell 52 is connected to a first terminal 53, and the negative pole is connected to a second terminal 54. The path connecting the battery cell 52 and the terminals 53 and 54 constitutes a current path in which current flows during charging and discharging.

In the protection circuit according to this embodiment, at least one switching element which is operated to shut off the current path during abnormality, which in this case includes a first switching element 55 and a second switching element 56 each composed of an FET, are provided in the current path. That is, the first and second switching elements 55 and 56 are connected in series between the negative pole of the battery cell 52 and the terminal 54. More specifically, a source electrode of the switching element 55 is connected to the negative pole of the battery cell 52, a drain electrode of the switching element 55 is connected to a drain electrode of the switching element 56, and a source electrode of the switching element 56 is connected to the terminal 54.

A gate electrode of each of the switching elements 55 and 56 is connected to a protective control circuit 57 composed of a protective IC. The protective control circuit 57 applies signals that turn on or off the switching elements 55 and 56 to the gate electrode of each of the switching elements 55 and 56. Thus, the current path shut-off operations by the switching elements 55 and 56 are realized.

The protective control circuit also has first and second input terminals 57a and 57b. The first input terminal 57a is connected to a junction point 58 which lies between the positive pole of the battery cell 52 and the terminal 53. A resistor 59 is connected between the junction point 58 and the input terminal 57a. One end of a positive temperature coefficient thermistor 60 is connected to the second signal input terminal 57b. The positive temperature coefficient thermistor 60 corresponds to a first positive temperature coefficient thermistor of this embodiment of the present invention. The other end of the positive temperature coefficient thermistor 60 is connected to a junction point 61 between the source electrode of the second switching element 56 and the terminal 54. That is, the positive temperature coefficient thermistor 60 is connected between the signal input terminal 57b and the source electrode of the switching element 56. In other words, the positive temperature coefficient thermistor 60 is not inserted in series into the current path for charging and discharging of the battery cell 52. Note that the positive temperature coefficient thermistor 60 is thermally connected to the second switching element 56.

A resistor 62 is connected in series to the end, which is connected to the signal input terminal 57b, of the positive temperature coefficient thermistor 60. The other end of the resistor 62 is connected to a junction point 63 lying between the positive pole of the battery cell 52 and the terminal 53.

Consequently, the resistor 62 and the positive temperature coefficient thermistor 60 are connected in series to each other and are connected in parallel between the positive pole and the negative pole of the battery cell 52.

A terminal 57c of the protective control circuit 57 is connected via a junction point 66 to the negative pole of the battery cell 52. A terminal 57d of the protective control circuit 57 is connected via a resistor 67 to the terminal 54.

In the battery pack protection circuit according to this embodiment, when an abnormal current flows during charging/discharging of the battery cell 52, the protective control circuit 57 shuts off at least one of the switching elements 55 and 56. As a result, the current path is shut off and protection of the battery pack 51 is performed.

Figure 7:
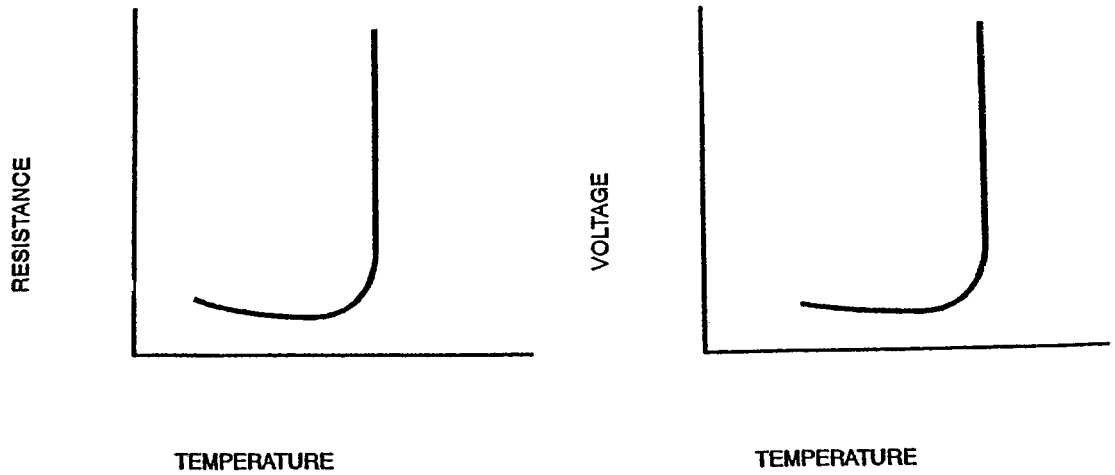
FIG. 7(a) is a graph showing a resistance-temperature characteristic of a positive temperature coefficient thermistor used in the sixth embodiment.
FIG. 7(b) is a graph showing a change in voltage Vp with time at a junction point P in FIG. 6.

According to this embodiment, for example, when the switching element 56 is abnormally overheated first and in a high-temperature state and even when the entire battery pack 51 does not reach an overheated state, since the positive temperature coefficient thermistor 60 is thermally connected to the switching element 56, the resistance of the positive temperature coefficient thermistor 60 increases abruptly. That is, as shown in FIG. 7(*a*), in a positive temperature coefficient thermistor, as the temperature increases, the resistance increases abruptly. Consequently, as shown in FIG. 7(*b*), the voltage Vp at a junction point P between the positive temperature coefficient thermistor 60 and the resistor 62 abruptly increases as the temperature increases. Accordingly, the voltage to be applied to the signal input terminal 57b of the protection control circuit 57 abruptly increases, and the protective control circuit 57 gives electrical signals that turn off the switching elements 55 and 56.

That is, according to this embodiment, not only in the case in which an abnormal current flows in the current path, but also in the case in which the switching element 56 is abnormally overheated, the protection control circuit 57 receives signals indicating such abnormal state, whereby the battery pack 51 can be protected. Thus, abnormal overheating of the switching element 56 is detected before the entire battery pack reaches abnormal overheating, and protection can be performed. Consequently, in the case in which a high load state continues or in similar cases, the switching element 56 can be turned off before the switching element 56 is subjected to thermal runaway or failure. In addition, since no positive temperature coefficient thermistor is inserted into the current path, the loss hardly increases.

FIG. 8 is a circuit diagram showing a structure of a battery pack protection circuit according to a variation example of the embodiment described above. In the battery pack 51 shown in FIG. 6, one positive temperature coefficient thermistor 60 is thermally connected to one switching element 56. As shown in FIG. 8, the positive temperature coefficient thermistor 60 may be thermally connected to both of the first and second switching elements 55 and 56. In such a case, even when an abnormal overheated state occurs only in one of the switching elements 55 and 56, or even when an abnormal overheated state occurs in both switching elements 55 and 56, the battery pack can be reliably protected.

FIG. 9 is a circuit diagram showing a structure of a battery pack protection circuit according to another variation example of the embodiment described above. In the battery pack protection circuit shown in FIG. 9, as the first thermistor, two positive temperature coefficient thermistors 60 and 60A are connected in series to each other. One positive temperature coefficient thermistor 60A is thermally connected to the switching element 55, and the other positive temperature coefficient thermistor 60 is thermally connected to the switching element 56 as in the sixth embodiment.

In the protection circuit shown in FIG. 9, when the switching element 56 is abnormally overheated, the resistance of the positive temperature coefficient thermistor 60 increases abruptly, and thus protection is achieved. When the switching element 55 is abnormally overheated, the resistance of the positive temperature coefficient thermistor 60A increases abruptly, and thus protection is achieved. In such a manner, a plurality of positive temperature coefficient thermistors, which are thermally connected to a plurality of switching elements, respectively, may be connected in series. In such a case, since the resistance-temperature characteristic curve is steep in the positive temperature coefficient thermistor, if any one of the plurality of positive temperature coefficient thermistors connected in series detects an abnormal temperature to increase the resistance, the resistance of the entire circuit composed of the positive temperature coefficient thermistors connected in series greatly increases. Thus, only by detecting the change in resistance of the series circuit, the battery pack can be reliably protected even when abnormal overheating occurs in any of the plurality of switching elements.

Figure 10:
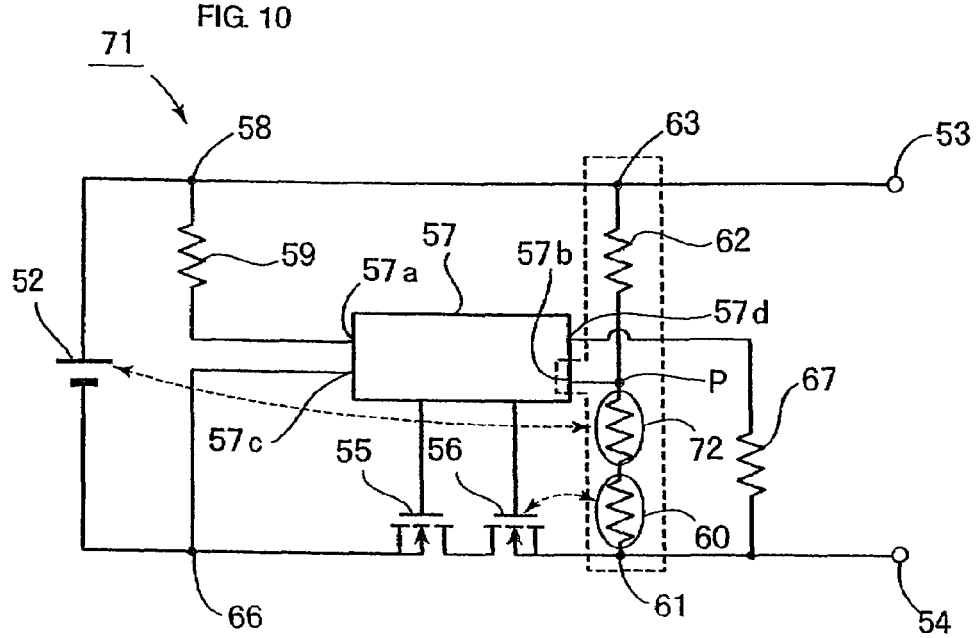
FIG. 10 is a circuit diagram showing a battery pack protection circuit according to a seventh embodiment.
Figure 11:
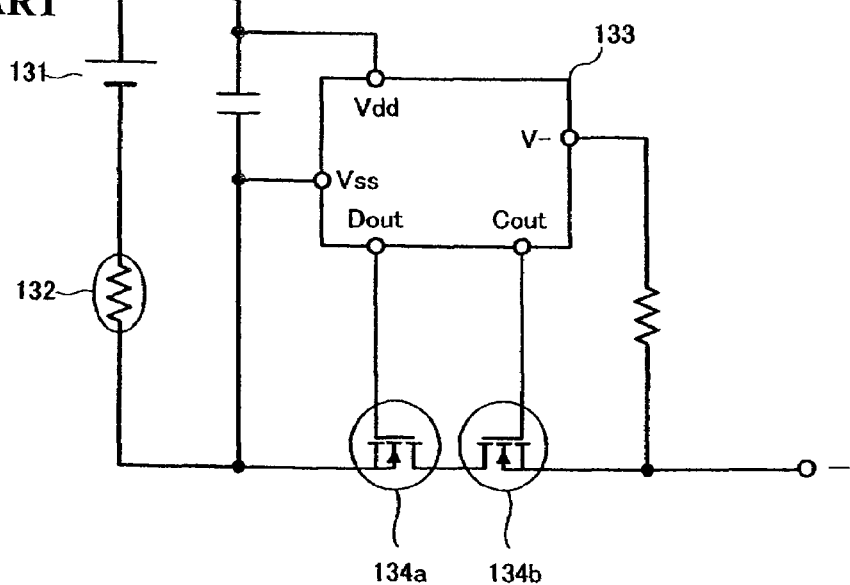
FIG. 11 is a circuit diagram showing a structure of a known battery pack.

FIG. 10 is a circuit diagram showing a structure of a battery pack protection circuit according to a seventh embodiment. In a battery pack 71 according to the seventh embodiment, a positive temperature coefficient thermistor 60 is thermally connected to a switching element 56 as in the sixth embodiment. In this embodiment, a second positive temperature coefficient thermistor 72 is connected in series to the positive temperature coefficient thermistor 60. The second positive temperature coefficient thermistor 72 is thermally connected to a battery cell 52. The remainder of the structure of the protection circuit in the seventh embodiment is the same as that of the protection circuit in the sixth embodiment. The same components are designated with the same reference numerals, and detailed description thereof is omitted.

In the protection circuit shown in FIG. 10, the second positive temperature coefficient thermistor 72 is thermally connected to the battery cell 52. Consequently, when the battery cell 52 itself is abnormally overheated, the resistance of the positive temperature coefficient thermistor 72 increases abruptly, and the voltage Vp increases abruptly. Accordingly, the protective control circuit 57 also turns off the switching elements 55 and 56 when the battery cell 52 is abnormally overheated and shuts off the current path, and thus protection is achieved.

As described above, in the battery pack protection circuit of the present invention, in addition to the first positive temperature coefficient thermistor which is thermally connected to at least one switching element, the second positive temperature coefficient thermistor 72 which is thermally connected to another heat-generating part, such as the battery cell 52, may be provided, and the first and second positive temperature coefficient thermistors may be connected in series. In such a case, by detecting abnormal overheating of the heat-generating part thermally connected to the second positive temperature coefficient thermistor, protection of the battery pack can be achieved.

When the first positive temperature coefficient thermistor 60 and the second positive temperature coefficient thermistor 72 are used together, the resistance-temperature characteristic may be the same or different for both thermistors. Since the overheated state of the switching element and the overheated state of the other heat-generating part may be different, desirably, the resistance-temperature characteristic of each of the positive temperature coefficient thermistors 60 and 72 may be selected so as to be suitable for the corresponding switching element and heat-generating part. Accordingly, preferably, the resistance-temperature characteristic of the first positive temperature coefficient thermistor 60 may be different from the resistance-temperature characteristic of the second positive temperature coefficient thermistor 72.

In the seven embodiments and variation examples described above, two switching elements (34a and 34b, or 55 and 56) are used as the switching element. The switching element as an element that performs protection by shutting off the current path is not limited to being the disclosed pair of switching elements. Furthermore, only one switching element may be used, or three or more switching elements may be used.

Although the present invention has been described in relation to particular embodiments thereof, many other variations and modifications and other uses will become apparent to those skilled in the art. Therefore, the present invention is not limited by the specific disclosure herein.

What is claimed is:

1. A battery pack protection circuit comprising:
at least one switching element which has a control terminal, for being connected in series to a positive pole or a negative pole of a battery cell, for being turned off during an abnormality for shutting off a current path for charging/discharging the battery cell; and
a protective control circuit connected to the control terminal of the at least one switching element such that the at least one switching element can be turned off when an abnormal current flows through the current path, the protective control circuit further having a signal input terminal for receiving a signal showing an abnormal state other than the abnormal current, the at least one switching element being turned off when a signal showing said abnormal state is input to the signal input terminal,
wherein a first positive temperature coefficient thermistor thermally connected to the at least one switching element is further provided, and a signal corresponding to a change in the resistance of the first positive temperature coefficient thermistor due to overheating of the switching element to which the first positive temperature coefficient thermistor is thermally connected is input, as the signal showing the abnormal state, to the signal input terminal.

2. The battery pack protection circuit according to claim 1, wherein a plurality of switching elements which shut off the current path are provided, and the first positive temperature coefficient thermistor is thermally connected to each switching element, and a plurality of first positive temperature coefficient thermistors are electrically connected in series.

3. The battery pack protection circuit according to claim 2, further comprising at least one second positive temperature coefficient thermistor thermally connected to a heat-generating part other than the at least one switching element, and the first positive temperature coefficient thermistor thermally connected to the switching element and the at least one second positive temperature coefficient thermistor are connected in series.

4. The battery pack protection circuit according to claim 3, wherein the heat generating part corresponds to a battery cell, and the second positive temperature coefficient thermistor is thermally connected to the battery cell.

5. The battery pack protection circuit according to claim 4, wherein the resistance-temperature characteristic of the first positive temperature coefficient thermistor thermally connected to the switching element is different from the resistance-temperature characteristic of the second positive temperature coefficient thermistor thermally connected to the heat-generating part.

6. The battery pack protection circuit according to claim 3, wherein the resistance-temperature characteristic of the first positive temperature coefficient thermistor thermally connected to the switching element is different from the resistance-temperature characteristic of the second positive temperature coefficient thermistor thermally connected to the heat-generating part.

7. The battery pack protection circuit according to claim 1, further comprising at least one second positive temperature coefficient thermistor thermally connected to a heat-generating part other than the at least one switching element, and the first positive temperature coefficient thermistor thermally connected to the switching element and the at least one second positive temperature coefficient thermistor are connected in series.

8. The battery pack protection circuit according to claim 7, wherein the heat-generating part corresponds to a battery cell, and the second positive temperature coefficient thermistor is thermally connected to the battery cell.

9. The battery pack protection circuit according to claim 8, wherein the resistance-temperature characteristic of the first positive temperature coefficient thermistor thermally connected to the switching element is different from the resistance-temperature characteristic of the second positive temperature coefficient thermistor thermally connected to the heat-generating part.

10. The battery pack protection circuit according to claim 7, wherein the resistance-temperature characteristic of the first positive temperature coefficient thermistor thermally connected to the switching element is different from the resistance-temperature characteristic of the second positive temperature coefficient thermistor thermally connected to the heat-generating part.

11. A battery pack comprising the battery pack protection circuit according to claim 1, further comprising the battery cell.

* * * * *